Nov. 21, 1967 TOSHIYUKI SATO ET AL 3,353,731
SELECTIVE FILM DRIVE FOR FILM HAVING DIVERSE CHARACTERISTICS
Filed Dec. 20, 1965 3 Sheets-Sheet 1

United States Patent Office 3,353,731
Patented Nov. 21, 1967

3,353,731
SELECTIVE FILM DRIVE FOR FILM HAVING DIVERSE CHARACTERISTICS
Toshiyuki Sato and Seki Kono, Nagoya, Japan, assignors to Elmo Company Limited, Nagoya, Japan
Filed Dec. 20, 1965, Ser. No. 523,827
3 Claims. (Cl. 226—54)

This invention relates in general to a small sized motion-picture projector and more particularly to a film feed mechanism for transporting a length of 8 mm. wide motion-picture film at a selected one of two feed speeds in accordance with the type of film involved.

As will be well known, there are two types of 8 mm. wide cinefilm. One type of 8 mm. wide cinefilm is frequently called the double width 8 mm. cinefilm adapted to be exposed in double width in the opposite directions and to be slit to give two strands of film for projection and the other type of 8 mm. wide cinefilm is often called the single width 8 mm. cinefilm adapted to be exposed in single width providing a projection film. Both types of 8 mm. wide projection film are slightly different from each other in both format and perforation dimension and pitch.

In the 8 mm. wide motion-picture projectors adapted to be selectively used with both types of 8 mm. wide projection film as above described, especially when a sprocket wheel is used for that purpose, it is required to use the particular sprocket wheel in accordance with the pitch of perforation on the film involved. As the simplest procedure, therefore, it may be practiced to provide a pair of different sprocket wheels suitable for selective use with the two types of 8 mm. wide projection film and to incorporate detachably in to the projector either one of the sprocket wheels in accordance with the type of film used. However, such sprocket wheels should be inevitably different in diameter from each other because of a difference in perforation pitches for both types of film. This results in the necessity of simultaneously interchanging a retainer for the sprocket wheel ensuring that the sprocket wheel is properly engaged by the adjacent portion of a length of film. Therefore, while this measure may appear to be simple in principle it causes the users to encounter an extremely difficult and troublesome problem. It is desirable to permit the two types of 8 mm. wide projection film as above described to be selectively used with a single 8 mm. motion-picture projector in a simple and easy manner.

A general object of the invention is, accordingly, to provide an improved small-sized 8 mm. wide motion-picture projector capable of being selectively used with two types of 8 mm. wide projection film slightly different in perforation pitch.

An object of the invention is to provide, in an 8 mm. wide motion-picture projector an improved film feed mechanism including a pair of sprocket wheels capable of being selectively put into the respective operative positions and driven at respective predetermined speeds of revolution in accordance with the type of 8 mm. wide motion-picture film involved thereby to feed a length of the film at a predetermined speed.

According to the teachings of the invention, there is provided a small-sized, 8 mm. wide motion-picture projector for selective use with two types of 8 mm. wide motion-picture film slightly different in format and perforation pitch from each other, comprising a film feed mechanism including a rotatory shaft, a pair of sprocket wheels disposed in spaced relationship on the rotatory shaft, one for each type of film, of film to continuously feed the associated length of motion-picture film, means for axially moving the rotatory shaft and the sprocket wheels to selectively put one of the sprocket wheels into its operative position, means for driving the rotatory shaft, and means for changing the number of revolution of the rotatory shaft from one to the other predetermined value simultaneously with the above mentioned movement of the sprocket wheels whereby an intermittent movement of the motion-picture film is synchronized with the continuous movement of the film caused by the selected sprocket wheel.

The invention will become more readily apparent from the following detailed description taken in conjunction with the accompanying drawings in which.

The invention is based upon the principle that, in order to selectively feed two types of 8 mm. wide motion-picture film slightly different from each other in format and perforation pitch, the tooth numbers for a pair of sprocket wheels for selectively feeding either of lengths of such film are selected to allow both sprocket wheels to be substantially equal in diameter to each other while the selection of the sprocket wheels in accordance with the type of motion-picture film involved results automatically in the selected one of the sprocket wheels being ready for rotation at a predetermined speed suitable for feeding the length of that type of film. In this connection it is to be noted that the conventional push rollers or retainers for forcing the motion-picture film against the associated sprocket wheel remain unchanged with the result that, by operating a simple operating mechanism, the operator can select the operative position of the film feed device in accordance with the type of 8 mm. wide motion-picture film involved.

Figure 1:
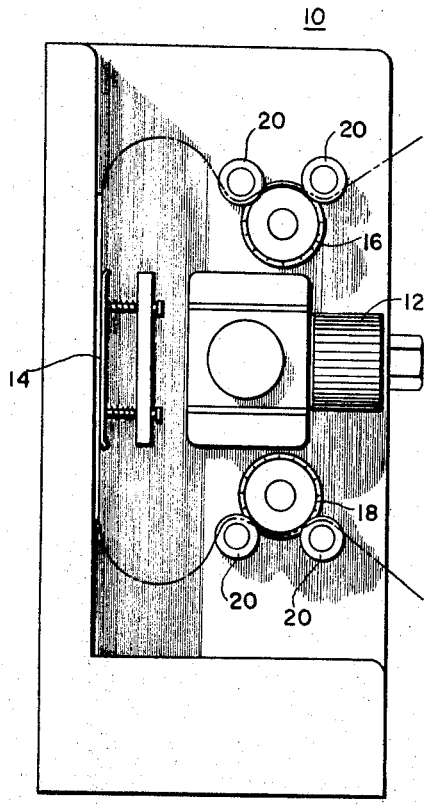
FIG. 1 is a diagrammatic side elevational view of a film feed device constructed in accordance with the teachings of the invention.

Referring now to FIG. 1, there is illustrated a film feed device constructed in accordance with the teachings of the invention. The reference numeral 10 designates a frame shown as including therein the essential part composed of a photographic objective 12, a film gate or aperture 14 aligned with the photographic objective 12, a pair of sprocket wheels 16 and 18 disposed above and below the objective to continuously feed a length of 8 mm. wide motion-picture film, a plurality of push rollers 20 in this case, two rollers for maintaining the film in engagement with the associated sprocket wheel 16 or 18 and a mechanism for intermittently feeding the length of motion-picture film (not shown).

Figure 2:
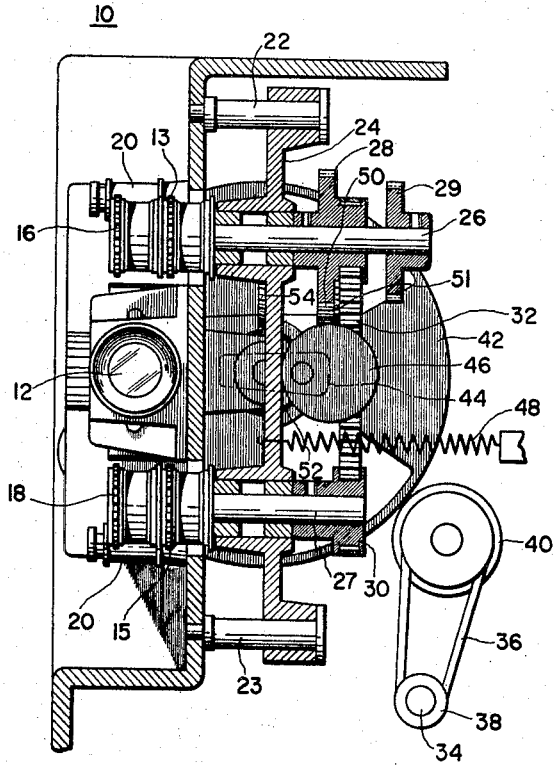
FIG. 2 is a longitudinal sectional view of the device illustrated in FIG. 1 and in one of its two operative positions where the device is adapted to feed one of the two types of 8 mm. wide motion-picture film as previously described.

As shown in FIG. 2, the frame 10 has planted thereon a pair of upper and lower guiding rods 22 and 23 respectively on which a movable support plate 24 is movably supported. Rotatably supported by the support plate 24 are a pair of upper and lower sprocket shafts 26 and 27 respectively. Each of the sprocket shafts 26 and 27 is provided on one end portion projecting externally of the frame 10 with a pair of spaced sprocket wheels 16 and 13 or 18 and 15. The sprocket wheels 16 and 18 are in a common plane and provided for one type of 8 mm. wide motion-picture film while the sprocket wheels 13 and 15 are also in another common plane substantially parallel to the first-mentioned plane and provided for the other type of 8 mm. wide motion-picture film. The upper sprocket shaft 26 has a pair of spaced spur gears 28 and 29 rigidly secured on the other end portion and different in diameter from each other while the lower sprocket shaft 13 has rigidly secured on the other end a spur gear 30.

Figure 6:
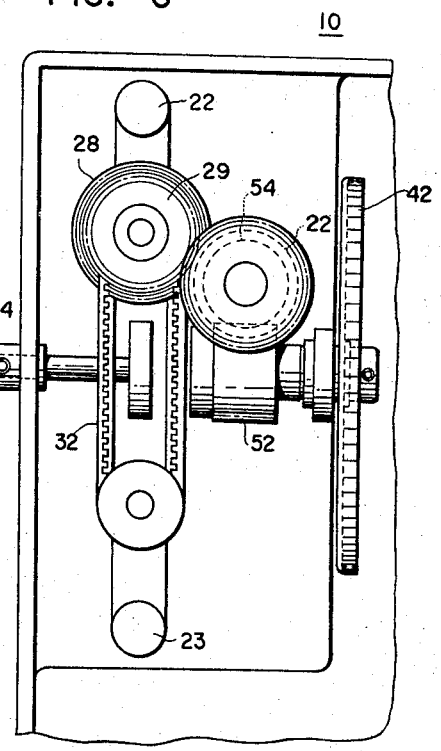
FIG. 6 is a rear end view of the device illustrated in FIG. 1.

The sprocket shafts 26 and 27 are arranged to be driven a common speed of revolution by a suitable drive (not shown) and a transmission member 32 free from slippage such as an endless timing belt or a gearing as will be readily understood from the illustration of FIG. 6. The remainder of details of the construction may be best understood with reference to the description of the operation which will subsequently be made.

Figure 3:
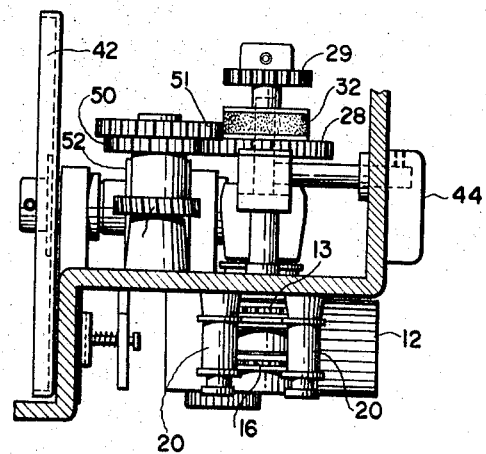
FIG. 3 is a cross sectional view of the device illustrated in FIGS. 1 and 2 and in its operative position identical to that shown in FIG. 2.

With the various components above described put in their positions illustrated in FIGS. 2 and 3, the lefthand or outer sprocket wheels 16 and 18 are put in their operative position where they engage the selected one of two types of 8 mm. wide motion-picture film or the one type of film whose longitudinal axis lies the vertical line X—X perpendicularly the intersecting optical axis of the objective 12. In operation, rotational movement of a rotatory shaft 34 caused by a drive such as an electric motor (not shown) is transmitted from a driving pulley 38 through an endless belt 36 to a drive pulley 40 and thence to a shutter pulley 42. As in the conventional type of projectors, a cam (not shown) disposed on the axis of the shutter pulley 42 drives a feed claw (not shown) which, in turn, draws down that portion of the film facing the film gate 14, for example, one frame for each complete revolution of a shutter in the conventional manner with the result that the length of film is intermittently fed or transported. The mechanism for effecting such intermittent transportation of the film is well known in the art and such mechanism itself does not constitute a part of the invention. Therefore the mechanism need not be described in detail.

Simultaneously with the intermittent transportation of the film the pair of sprocket wheels 16 and 18 in their operative positions are driven to continuously transport the length of film in synchronization with the intermittent transportation of the latter.

Figure 4:
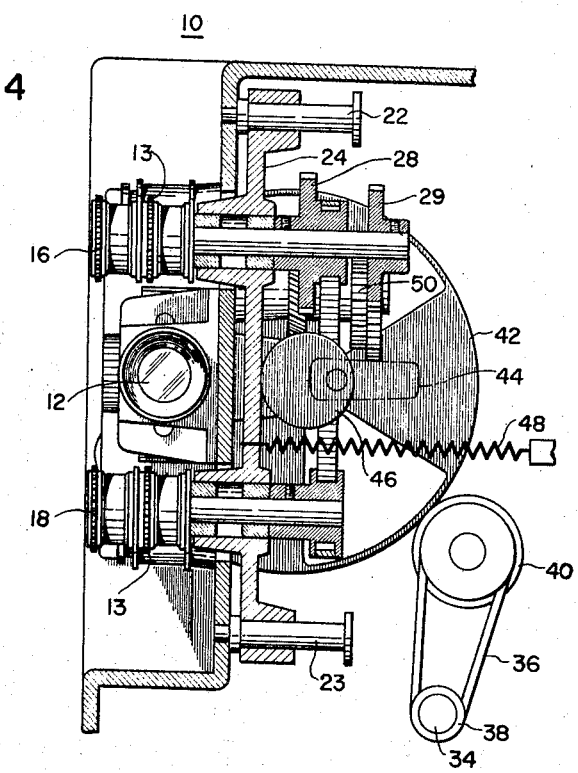
FIG. 4 is a view similar to FIG. 2 but illustrating the device in the other operative position where it is adapted to feed the other of the two types of 8 mm. wide motion-picture film.
Figure 5:
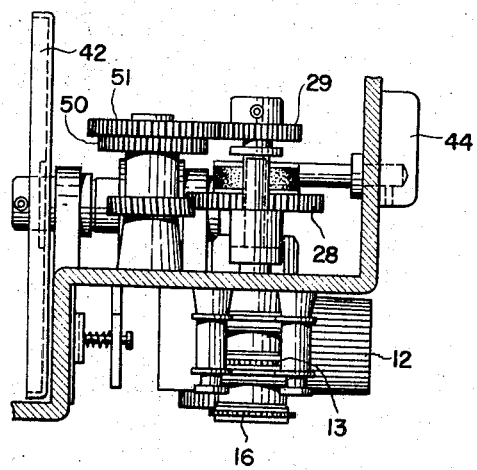
FIG. 5 is a view similar to FIG. 3 but illustrating the device in the other operative position identical to that shown in FIG. 4.

If it is desired to use the other type of motion-picture film, an operating knob 44 disposed on one side of the frame member 10 can be operated to move the movable support plate 24 in the lefthand direction as viewed in FIG. 2 along the guiding rods 22 and 23 through a cam 46 integral with the operating knob 44 and against the action of a spring 48. This movement of the support plate 24 causes disengagement of the gear 28 from a gear 50 and simultaneously engagement of the gear 29 with a gear 51. At the same time the sprocket wheels 16 and 18 are moved in the inoperative positions and instead the sprocket wheels 17 and 19 are brought into their operative positions or the positions where the sprocket wheels 16 and 18 were previously located. Thus the various components of the present device are put in their positions as illustrated in FIGS. 4 and 5. It will be appreciated that the knob 44 can be again operated to move the support plate 24 into its position illustrated in FIGS. 2 and 3 thereby to bring the sprocket wheels 16 and 18 and the gear 28 into their operative positions.

In other words, the operating knob 48 can be moved in the one or the other direction in accordance with the type of 8 mm. wide motion-picture film to be used to cause the support plate 24 to slide axially of the guiding rods 22 and 23. This sliding movement of the support plate 24 causes movement of sprocket means including the sprocket wheels 16 through 19, the gears 50 and 51 and the endless belt 32 in the direction of the sprocket shaft until the pair of sprocket wheels 16 and 18 or 17 and 19 are brought into their operative positions where they can engage the associated motion-picture film with the gear 51 meshing either of the gears 28 and 29. At the same time the sprocket shafts 26 and 27 are automatically set to have a common number of revolution commensurable with the number of revolution of the shutter determined by the tooth number of the sprocket wheels 16 and 18 or 17 and 19. That is, the sprocket shafts are automatically set to be rotatable in synchronization with movement of the claw by which the film is drawn down.

As an example, it is assumed that two types of 8 mm. wide motion-picture film have a ratio of perforation pitch of 10:9 and that the pair of sprocket wheels 16 and 18 are used to transport one type of film having a shorter perforation pitch. Under these circumstances, the sprocket wheels 16 and 18 may have twenty teeth formed on the periphery. Then another pair of sprocket wheels 17 and 19 should have eighteen teeth formed on the periphery, assuming that both pairs of the sprocket wheels are the same in diameter. Also when the sprocket wheels 16 and 18 are in their operative positions the gear 28 is in meshing engagement with the gear 32. Under these circumstances, the overall reduction ratio provided by a worm 52, a gear 54, the gear 28 and the gear 50 are selected to render a ratio between the respective numbers of revolution of the shutter shaft and the sprocket wheels equal to a valve of 20:1 whereby the sprocket wheels are rotated in synchronization with the operation of the claw resulting in the proper transportation of the film.

With the other type of the film having a higher perforation pitch, the sprocket wheels 17 and 19 are brought into their operative positions and meshing of the gear 28 with the gear 50 is replaced by meshing of the gear 29 with the gear 51 as previously described. Under these circumstances, the overall reduction gear ratio between the shutter shaft associated with the worm 52 and the gears 54, 29 and 51 and the sprocket shafts are selected to be equal to a value of 18:1 in order to attain the desired purpose.

While the invention has been described under assumed condition that the ratio of perforation pitch is equal to a ratio between two simple integers such as the integers 10 and 9 it is to be understood that the invention is equally applicable to any ratio of perforation pitch not exactly equal to a ratio between two integers. This is because the sprocket wheel pairs are not requital to be exactly equal in diameter to each other for the practical purposes. In the latter case, the tooth numbers for the respective sprocket wheel pairs may be determined so as to cause the wheel pairs to have the respective diameters substantially equal to each other and then the overall reduction gear ratio is determined upon the basis of the principle of the invention as above described.

While the invention has been described in conjunction with a preferred embodiment thereof it is to be understood that various changes in the detail of construction and the combination and arrangement of parts may be resorted to without departing from the spirit and scope of the invention. For example, while the support plate 24 serving to support the sprocket shafts 26 and 27 are illustrated as being movable as a whole it is possible to move individually the respective sprocket shafts to switch meshing of gears or the number of revolution of the sprocket shafts. Also the number of revolution of the sprocket shafts may be varied by the provision of the worm 52 selectively engageable by a pair of worm gears.

What we claim is:

1. A film feed mechanism for use in a small-sized motion-picture projector for selectively projecting two types of motion picture film different in format and dimensions from each other, comprising a rotatory shaft, a pair of sprocket wheels disposed in spaced relationship on said rotatory shaft, one for each type of film, to continuously feed the associated length of motion-picture film, means for axially moving said rotatory shaft and said sprocket wheels to selectively put one of said sprocket wheels in its operative position, means for driving said rotatory shaft, and means for changing the number of revolutions per unit of time of said rotatory shaft from one to the other predetermined value simultaneously with said movement of said sprocket wheels whereby the length of film is intermittently transported in synchronization with the continuous transportation of the same provided by the selected one of said sprocket wheels in its operative position.

2. A film feed mechanism for use in a small-sized motion-picture projector for selectively projecting two types of motion-picture film different in format and dimensions from each other, comprising a movable support plate, a sprocket shaft rotatably extending through and supported to said movable support plate, a pair of sprocket wheels, one for each type of film, disposed in spaced relationship on one end portion of said sprocket shaft to continuously transport a length of motion-picture film, means for moving said support plate to selectively bring one of said sprocket wheels into its operative position, and means including means for driving said sprocket shaft to change the number of revolutions per unit of time of said shaft and said sprocket wheels from one predetermined value to another, the arrangement being such that, the movement of the selected one of said sprocket wheels into its operative position simultaneously effects said change in the number of revolutions per unit of time of said sprocket wheels whereby the length of film is intermittently transported in synchronized with the continuous transportation of the same provided by the selected one of said sprocket wheels in its operative position.

3. A film transporting device as claimed in claim 1, wherein said pair of sprocket wheels are substantially equal in diameter to each other and each of said wheels is provided on the periphery with teeth in such a number that the same together with said means for changing the number of revolutions per unit of time of the sprocket wheels continuously transport the length of film in synchronization with the intermittent transportation of the latter.

References Cited
UNITED STATES PATENTS

| | | | |
|---|---|---|---|
| 1,978,638 | 10/1934 | Lessler et al. | 226—54 |
| 1,984,264 | 12/1934 | Gualtierotti | 352—80 |
| 2,057,153 | 10/1936 | Lessler | 352—80 |
| 2,354,679 | 8/1944 | Frankel | 352—80 |
| 2,757,572 | 8/1956 | Debrie | 352—79 X |
| 3,285,087 | 11/1966 | Wells | 226—76 X |

M. HENSON WOOD, Jr., *Primary Examiner.*

ALLEN KNOWLES. *Assistant Examiner.*